United States Patent
Deisinger et al.

(10) Patent No.: US 6,397,220 B1
(45) Date of Patent: May 28, 2002

(54) COMMON GATEWAY WHICH ALLOWS JAVA APPLETS TO MAKE PROGRAM CALLS TO OLTP APPLICATIONS EXECUTING ON AN ENTERPRISE SERVER REFERENCE TO CO-PENDING APPLICATIONS

(75) Inventors: Mark V. Deisinger, Shoreview, MN (US); Jeremy A. Freed, West Lafayette, IN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/164,759

(22) Filed: Oct. 1, 1998

(51) Int. Cl.[7] .............................................. G06F 17/30
(52) U.S. Cl. ..................... 707/102; 707/10; 707/103 R; 707/513; 707/2; 709/218
(58) Field of Search .................................. 707/1–4, 513, 707/10, 100–103; 709/217–219, 203

(56) References Cited

U.S. PATENT DOCUMENTS

| | | | | |
|---|---|---|---|---|
| 5,724,424 A | | 3/1998 | Gifford | 380/24 |
| 5,754,772 A | * | 5/1998 | Leaf | 709/203 |
| 5,974,441 A | * | 10/1999 | Rogers et al. | 709/200 |
| 6,012,067 A | * | 1/2000 | Sarkar | 707/103 |
| 6,041,362 A | * | 3/2000 | Mears et al. | 709/300 |
| 6,067,579 A | * | 5/2000 | Hardman et al. | 709/328 |
| 6,212,546 B1 | * | 4/2001 | Starkivich et al. | 709/203 |

FOREIGN PATENT DOCUMENTS

WO        WO98/25376    *    6/1998

OTHER PUBLICATIONS

"Data Warehousing within Internet: Prototype of a Web-based Executive Information System," Kurz et al., Proceedings of the 1997 Eighth International Workshop on Database and Expert Systems Applications, Sep. 1–2, 1997, pp. 627–632.*

"Data Access Services and Automatic Generation of Cooperating Interfaces," Moro et al.Proceedings of the 1998 3rd IFCIS Conference, IEEE 98EX122,pp. 177–186, Aug. 20–22, 1998.*

Jon G. Auerbach, "Open Market Inc. Says It Will Receive Patents for Internet–Commerce Software," *Wall Street Journal*, Mar. 3, 1998, p. 36.

* cited by examiner

Primary Examiner—Hosain T. Alam
(74) Attorney, Agent, or Firm—Charles A. Johnson; Mark T. Starr; Nawrocki, Rooney & Sivertson, P.A.

(57) ABSTRACT

Method and apparatus for an application program running on a Web browser to make service requests to a service routine running on an On-Line Transaction Processing (OLTP) system. When the application program requests a service on the OLTP system, the input data format required for the requested service is passed to the application program. The application program submits a service request to the service routine in the input data format, and receives a result of the service routine processing the service request in the output data format. The input and output data formats allow the application program to complete additional processing of the result in the output data format and make subsequent service requests to the OLTP system.

46 Claims, 13 Drawing Sheets

```
VIEW STORE_ID                                          ╱─420
#   type    cname       fbname    count   flag   size   null
#   int     id          id        1       -      -      -
END VIEW PRODUCT_IDS                                       ╱─430
type    cname       fbname    count   flag   size   null
#   int     num         num       1       -      -      -
    int     prodids     prodids   20      -      -      -
END VIEW RED_TAPE                                          ╱─440
type    cname       fbname    count   flag   size   null
#   double  approve     approve   1       -      -      -
END
```

FIG. 8

```
import java.applet.*;
import java.net.*;
import JGate;
import WebTxException;

public class AdminApplet extends Applet {
    private URL gatewayURL;
    ...
    private double markDown (int storeIDList[]){
        JGate storeID, markdownProds, returnView;
        int idField, prodidsField, i, fieldNum, worst[];
        try{
            storeID=new JGate("STORE_ID", gatewayURL, false);
            idField=storeID.getFieldNum("id");
            markdownProds=new JGate("PRODUCT_IDS", gatewayURL, false);
            prodidsField=markdownProds.getFieldNum("prodids");

for (i=0; i<storeIDList.length; i++) {
                storeID.setIntValue(idField, storeIDList[i]);
                returnView=storeID.callService("GetWorstTwo");
                worst=returnView.getIntArrValue(prodidsField, 0, 2);
                markdownProds.setIntArrValue(prodidsField, 0, worst, i * 2, 2);
            }
            fieldNum=markdownProds.getFieldNum("num");
            markdownProds.setIntValue(fieldNum, storeIDList.length * 2, 0);
            returnView=markdownProds.callService("CutRedTape");
            fieldNum=returnView.getFieldNum("approve");
            return returnView.getDoubleValue(fieldNum, 0);
        } catch(WebTxException e){
            return 0.0;
        }
    }
    ...
}
```

FIG. 9

COMMON GATEWAY WHICH ALLOWS JAVA APPLETS TO MAKE PROGRAM CALLS TO OLTP APPLICATIONS EXECUTING ON AN ENTERPRISE SERVER REFERENCE TO CO-PENDING APPLICATIONS

CROSS REFERENCE TO CO-PENDING APPLICATIONS

The present application is related to U.S. patent application Ser. No. 09/164,932, filed Oct. 1, 1998, entitled "Transaction Service Independent HTTP Server-to Transaction Gateway", assigned to the assignee of the present invention and incorporated herein by reference.

BACKGROUND OF THE INVENTION

1. Field of the Invention

The present invention relates generally to interfaces which provide access to On-Line Transaction Processing (OLTP) systems from a Web browser, and more particularly, to such interfaces which allow application programs written in the Java programming language to initiate service calls to, and process results returned from, services resident on the OLTP systems.

2. Description of the Prior Art

The methods by which companies conduct business with their customers are undergoing fundamental changes, due in part to World Wide Web technology. This same technology, which makes a company accessible to customers around the world, may also be used on internal company networks to complete operational and administrative tasks.

One of the technologies within the World Wide Web is the Web browser. Web browsers are quickly becoming a de facto user interface standard to the World Wide Web because of their ability to interpret and display information having standard formats (e.g., HyperText Mark-Up Language (HTML), standard text, GIF, etc.). Client software programs, typically referred to as Web browsers (e.g., Mosaic, Lynx, etc.), execute on client systems and issue requests to server systems. Server systems typically execute HyperText Transport Protocol (HTTP) server programs, and process requests received from the Web browsers. While Web browsers are quickly becoming a standard user interface in industry, many businesses still have information maintained and managed by prior art data base management systems such as DMS, RDMS, DB2, Oracle, Ingres, Sybase, Informix, and many others. Furthermore, many database management systems are being utilized as resources within larger transaction processing systems. In view of this, businesses have begun to recognize and capitalize on the growing prevalence of Web browsers in combination with providing access to data stored within their database management systems.

For example, businesses often store many kinds of data within centralized database management systems, such as product sales records, accounting records, and employee information. Often, access to data stored within these database management systems is required to assist in making business-related decisions. Service routines may be resident within the database management systems, and may be called via the Web browser by a user to process and return results based both on input parameters provided and on data stored within the database management system.

Since these service routines must often support a wide variety of requirements, efficiency and flexibility in their execution is desirable. Often, many service routine calls are necessary to achieve a desired result, and thus an interactive or iterative approach is preferred. To achieve this efficiency using the interactive or iterative approach, it is desirable to have the capability to complete additional processing of results returned from the service routine, and make additional service routine calls based on the additional processing.

In one approach, Common Gateway Interface (CGI) programs are used to provide Web browser access to data stored in database management systems. CGI is a standard for interfacing external applications, such as Web browsers, to information servers, such as Web servers. The CGI standard allows programs to be referenced by a Web browser and executed on a Web server system. With this approach, to make a UNIX database accessible via the World Wide Web, a CGI program is executed on the Web server system to transmit information to the database engine, receive results from the database engine, and format the data into an HTML document which is returned to the Web browser. While this approach does make the database accessible via the World Wide Web, the static nature of the HTML interface that the Web browser uses strictly limits the level of interactivity that the user can exercise with the data returned by the database.

Another approach which has been utilized is shown in U.S. patent application Ser. No. 09/033,325, filed Mar. 2, 1998, now U.S. Pat. No. 6,012,067, issued Jan. 4, 2000, entitled: "TRANSACTION SERVICE INDEPENDENT HTTP SERVER TO TRANSACTION GATEWAY", which has been incorporated herein by reference. This approach makes On-Line Transaction Processing (OLTP) systems and their associated databases accessible using HTTP interfaces. With this approach, the OLTP system is accessible to Web browsers by establishing a plurality of transaction gateway clients to receive HTTP requests sent to a Web server from a Web browser. The transaction gateway client establishes a static connection with the OLTP system, and translates between HTTP formatted requests from the Web browser and the request format expected by the OLTP system. This approach saves time by elimination of the prior art steps of connecting with and then disconnecting from the transaction processing system for each request from a browser program.

However, since HTML does not include decisional logic, the Web browser in this approach cannot complete additional processing or manipulate results returned as HTML documents from the OLTP system. This approach also thus does not allow applications executing on the Web browser to manipulate or process data returned from the OLTP service, or allow the applications to make subsequent program calls to the OLTP system based on the processing of returned data.

SUMMARY OF THE INVENTION

The present invention overcomes the disadvantages found in the prior art by providing an interface coupled to the Web server which allows a Web browser to initiate service routines resident on On-Line Transaction Processing (OLTP) systems through the interface, and complete additional processing or manipulation of data returned from the service routine.

In a preferred embodiment of the present invention, an interface is provided to allow application programs resident on a Web browser to make program calls to service routines resident on OLTP systems. In the preferred embodiment, these application programs are written in the Java programming language, and are referred to as Java applets. When a user accesses an OLTP system from a Web browser that includes Java applets, the applet may either be resident on the Web browser, or may be copied from the Web server to the Web browser, whereupon the applet is executed. Since Java is a regular programming language that includes decisional capabilities, any data returned from the OLTP program call can be subsequently manipulated by the Java applet, and the Java applet can use the manipulated data to make additional OLTP program calls.

In a preferred embodiment, the application program initiates the service routine through the interface by sending an input request to the server. The interface receives the input request if the input request is of a predetermined type. In the preferred embodiment, the interface receives the request if the input request is from the Java applet. The interface sends an input view definition back to the application program which defines an input data format for the requested service routine. The input view definition may be used to build an input screen on the browser which defines an input data format required to initiate the requested service routine. The input data format defines a number of input fields, each of which may accept input data entries from the user.

Once the input view definition has been received by the application program, and the input data format required for the requested service routine has been used to generate a service request, the application program may execute a service routine on the OLTP system through the interface by sending the service request to the server. The interface receives the service request if the service request is of a predetermined type. In the preferred embodiment, the interface receives the service request if the service request is sent from the Java applet. The interface sends the service request to the service routine where the service routine may perform any number of operations, using the input data provided in the service request, on data stored in the databases within the OLTP system.

In a preferred embodiment, a result of the service routine executing the service request is returned in an output data format to the interface, where the output data format corresponds to the service routine. If the output data format is different from the input data format, the interface sends an output view definition to the application program so that the application program may build an output screen on the browser to view the output results. The output view definition defines the output data format by defining the output fields necessary to display the result on the screen of the browser or to perform further program logic.

In a preferred embodiment, the application program may perform a number of operations on the output result which is in the output data format, and may send another service request to the browser to initiate another service routine. The service request may contain input data entries based on performing a number of operations on the output result returned from the previous service request.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 shows exemplary input and output views for an exemplary embodiment of the present invention;

FIG. 9 shows the MarkDown method, an excerpt of a Java applet for the exemplary embodiment of FIG. 8.

DETAILED DESCRIPTION OF THE PREFERRED EMBODIMENTS

Figure 1:
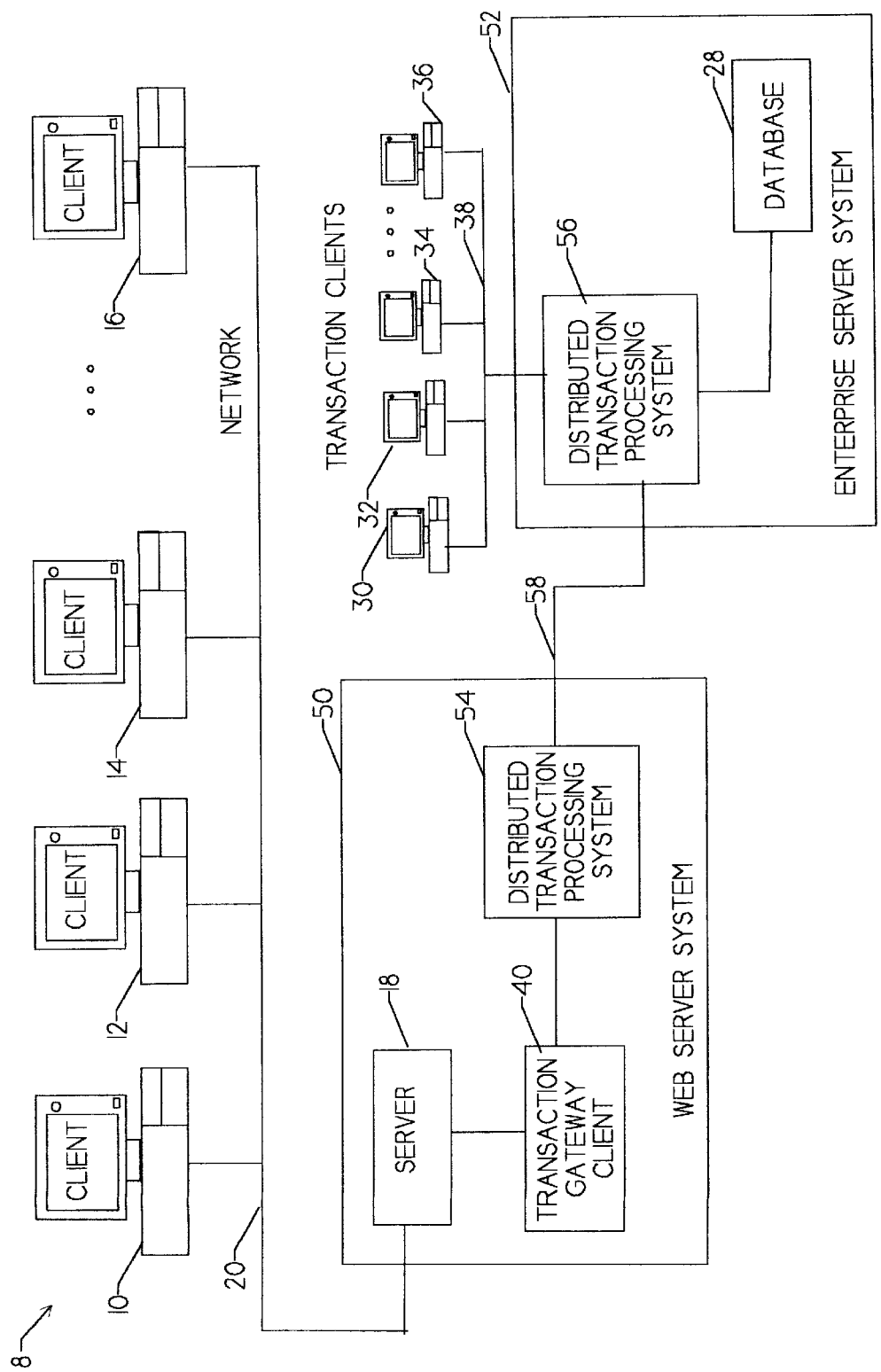
FIG. 1 is a block diagram of the preferred data processing system in which the present invention is implemented.

FIG. 1 is a block diagram of the preferred data processing system 8 in which the present invention is implemented. It is recognized that the present invention may be utilized in any data processing system wherein an interface coupled to a Web server allows a Web browser to initiate service routines resident on an On-Line Transaction Processing (OLTP) system through the interface, and complete additional processing or manipulation of data returned from the service routine, and where application programs resident on the browser initiate additional service routines within the OLTP system, based on processing of results returned from the service routine executing on the OLTP system.

In the preferred embodiment, a plurality of PC/Workstations, designated as clients 10, 12, 14 and 16 are coupled to a server 18 via a network 20. The network 20 may be an internal local area network, or may be the Internet. Each of the clients 10, 12, 14 and 16 is a Web browser. The Web browsers may be personal computers or workstations having operating system software and application software. This software provides Graphical User Interface (GUI) and communications capabilities to enable the client to communicate with server application 18 via network 20.

Web server system 50 may be any class of machines which are capable of running a server application 18 along with a distributed transaction processing system 54. With the transaction processing system 54, a transaction is formatted on the Web server system 50 and forwarded to the enterprise server system 52 for processing.

In the preferred embodiment, the enterprise server system 52 is a Unisys 2200 series data processing system which includes a distributed transaction processing system 56. The distributed transaction processing system 56 encompasses the same functionality as a monolithic transaction processing system. But in the preferred embodiment, the distributed transaction processing system 56 is designed to be compatible with the distributed transaction processing system 54. Distributed transaction processing systems 54 and 56 utilize transaction manager software, such as the Open/OLTP transaction manager software from Unisys, and utilize user implemented Open/OLTP services. Distributed transaction processing system 54 is coupled to distributed transaction processing system 56 via network 58. Preferably, the network interface for network 58 is separate from the network interface for network 20.

Distributed transaction processing system 56 provides data from database 28 to transaction clients 30, 32, 34 and 36. Transaction clients 30, 32, 34 and 36 are coupled to distributed transaction processing system 56 via interface 38.

In the preferred embodiment, transaction gateway client 40 allows server 18 to interface with distributed transaction processing system 54. When client 10, 12, 14 or 16 selects an enterprise based service, the request is routed to server 18, which in turn routes the request to transaction gateway client 40. Transaction gateway client 40 determines the requested service and forwards the necessary information to distributed transaction processing systems 54 and 56. Distributed transaction processing systems 54 and 56 process the request within database 28 according to the specified request (e.g., select, update, delete, etc.). Distributed transaction processing systems 54 and 56 return data and/or status information to transaction gateway client 40, which in turn formats the data in an appropriate manner for server 18. Server 18 then returns the information to requesting client 10, 12, 14 or 16.

Figure 2:
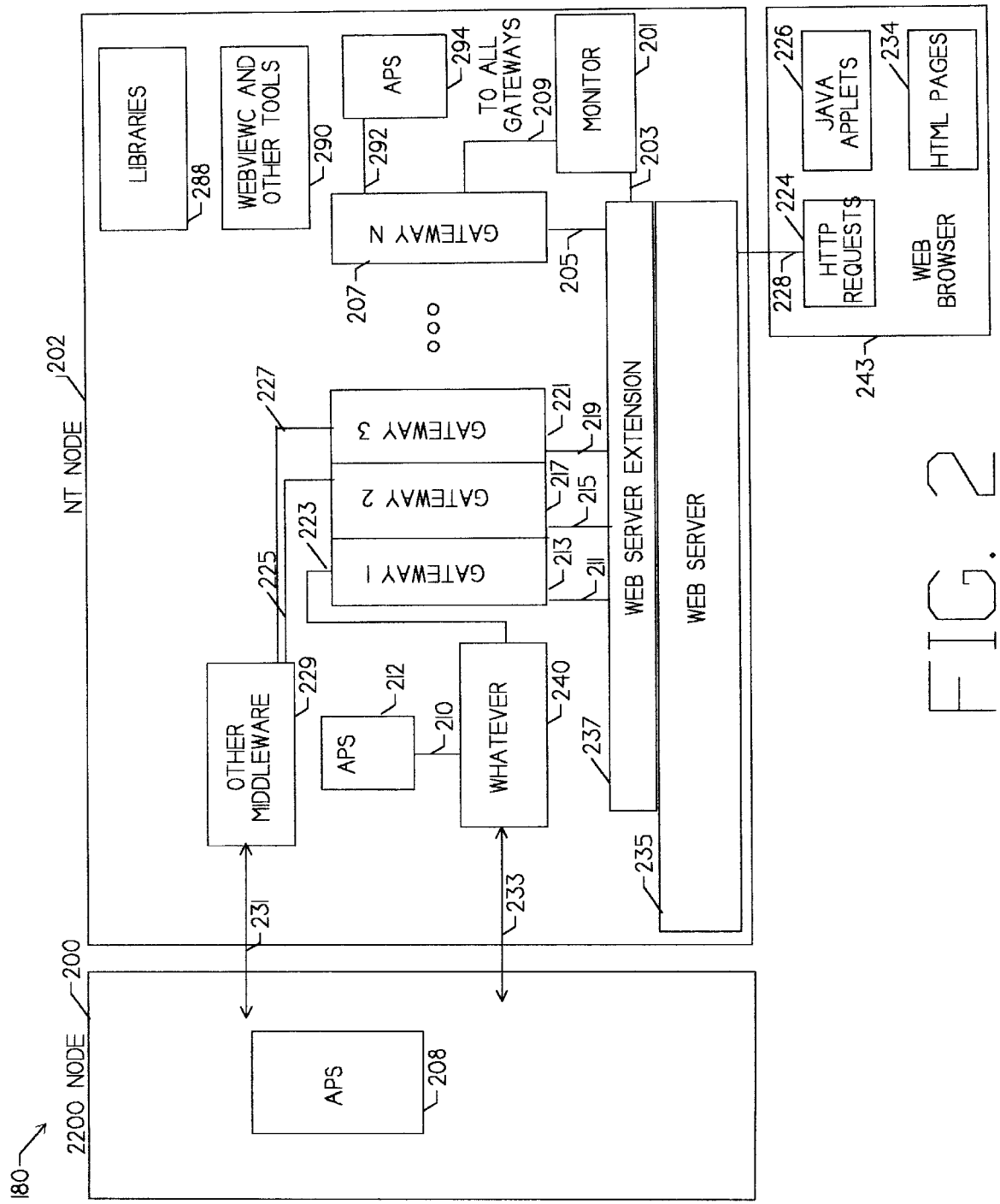
FIG. 2 is a block diagram of the preferred processing environment of the present invention.

FIG. 2 is a block diagram of the preferred processing environment of the present invention. A general WebTx processing environment is shown at 180. WebTx is a Unisys product. In general, WebTx is middleware in a client/server computing environment which accepts requests from the client side and routes the requests to the correct place on the server side, then passes a response from the server side back to the client side. In the context of the present invention, WebTx "marries" a Web-based client/server architecture with a transactional client/server architecture.

The WebTx environment, as utilized in the present invention, is comprised of several components, including a monitor 201, a Web server extension 237, one or more gateways 213, 217, 221, and 207, the WebViewC compiler 290, a set of libraries 288, and other special purpose tools shown at 290.

WebTx Monitor 201 communicates with Web server extension 237 via interface 203, and gateways 207, 213, 217, and 221 via interface 209. Monitor 201 functions as the WebTx administrative tool. One function of Monitor 201 is to start and stop gateways 207, 213, 217, and 221, as required. Under a Unix environment, the WebTx monitor module is known as WebMon, while under the Windows NT environment, the WebTx monitor module is known as WtxSvc.

WebTx Web server extension 237 is a run-time extension of Web server 235 (such as Netscape FastTrack, Netscape Enterprise, or Microsoft IIS). The function of Web server extension 237 is to intercept requests intended for WebTx, and instead route the requests to gateways 207, 213, 217, and 221. Web server extension 237 will also interpret the response from the gateways, and route the reply. Web server extension 237 is coupled to gateways 213, 217, 221 and 207 via interfaces 211, 215, 219 and 205, respectively. Web server extension 237 is connected to monitor 201 via interface 203, and receives HTTP requests 224 over network 228 to Web server 235. HTTP requests 224 are generated by Web browser 243 on behalf of Java applets 226 and HTML pages 234.

Gateways 213, 217, 221 and 207 perform tasks which are grouped into conceptual areas. Gateways 213, 217, 221 and 207 receive requests from Web server extension 237, or from applications 294, and take whatever action is necessary to fulfill the request. This typically involves transforming a request (such as a URL from a Web browser) into a format which is understandable by a distributed transaction processing system such as that within, for example, enterprise server system 52 (see also, FIG. 1). Gateways 213, 217, 221 and 207 also transform data returned from the distributed transaction processing system into a formatted response which is returned to the requester.

WebViewC compiler 290 is used in conjunction with specific Unisys gateway implementations, such as ViewGate, TUXGate, or JGate. WebViewC compiler 290 compiles Open/OLTP view files generated on the OLTP enterprise system to create WebTx view files (.wv) and HTML files (.html). WebViewC compiler 290 is a free-standing component with no direct communication to any of the other components within the WebTx environment.

Other WebTx Components include libraries 288 or the Software Development Kit (SDK) libraries, which provide framework and functions for building custom gateways. The SDK is specifically designed to allow customers to build their own gateways. Another type of library present within the WebTx system is Java class libraries, which provide class definitions for building Jgate-compatible applets.

Figure 3:
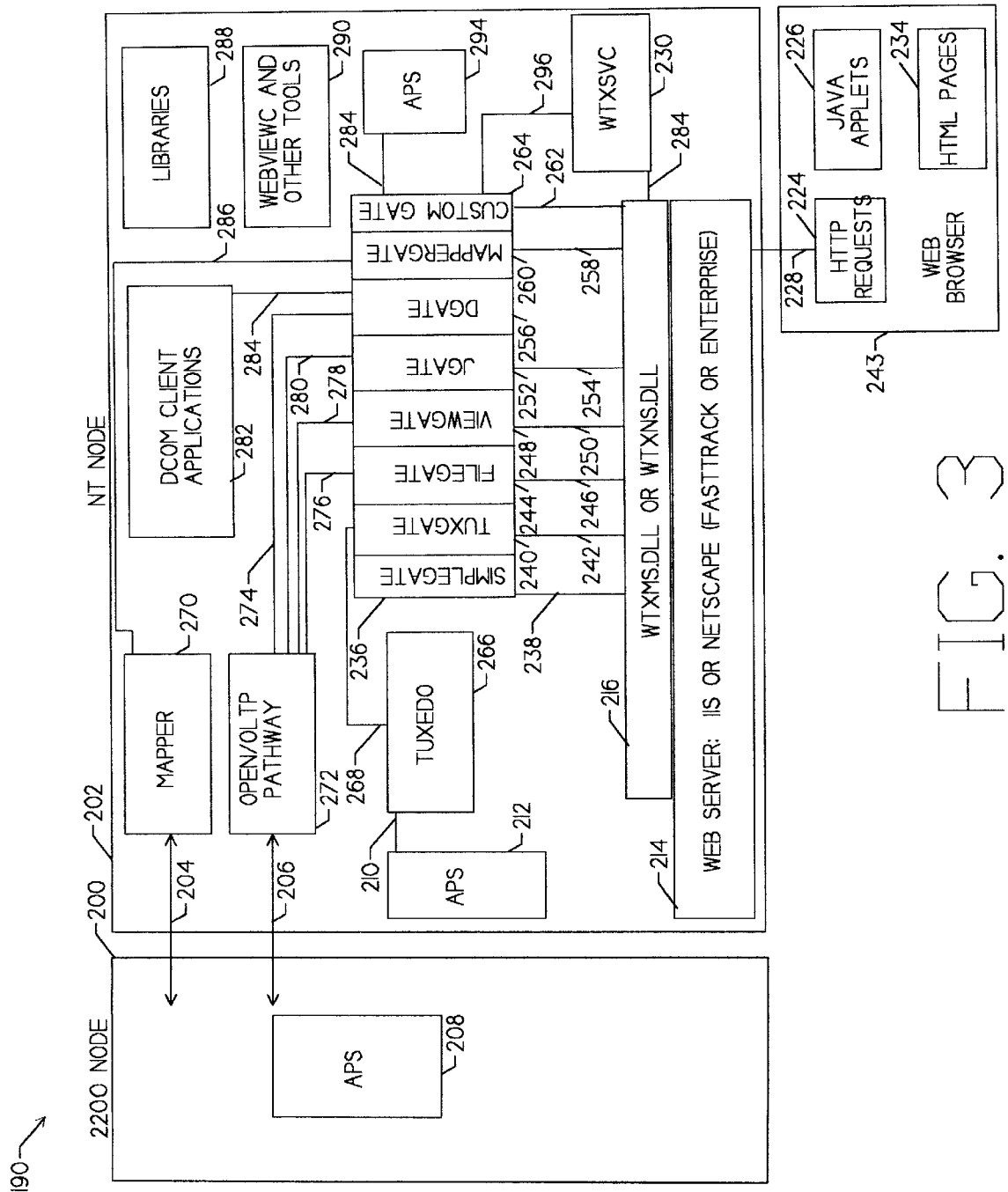
FIG. 3 is a block diagram showing the Microsoft NT processing environment incorporating the present invention.

FIG. 3 is a block diagram showing the Microsoft NT processing environment incorporating the present invention. The block diagram shown at 190 includes WebTx components utilized within a Microsoft NT environment and specific gateway implementations within Windows NT node 202.

SimpleGate Gateway 236 is a Unisys product which is specifically utilized as a test tool. It merely echoes a request. The TUXGate Gateway 240 is a Unisys product which provides generalized access to OLTP services through Tuxedo 266. Tuxedo 266 acts as the hub for distributed enterprise and Internet three-tier applications. Tuxedo 266 provides an open environment that supports a wide variety of clients, databases, networks, legacy systems, and communications options. The FileGate Gateway 244 is a Unisys product which works in conjunction with a specific OLTP service to access textual files on the Unisys 2200 node. ViewGate 248 is a Unisys product which provides generalized access to OLTP services on the Unsys 2200 node (e.g., HTML output). JGate 252 is a Unisys product in which the present invention is utilized which provides generalized Java applet access to OLTP services on the Unisys 2200 node. DGate gateway 256 is a Unisys product which provides generalized DCOM access to OLTP services on the Unisys 2200 node. MapperGate gateway 260 is a Unisys product which provides generalized access to Mapper applications within the Microsoft Windows NT environment. Custom gateway 264 is a user customized gateway wherein a customer can build a custom gateway to interface custom applications to an OLTP enterprise application.

Figure 4:
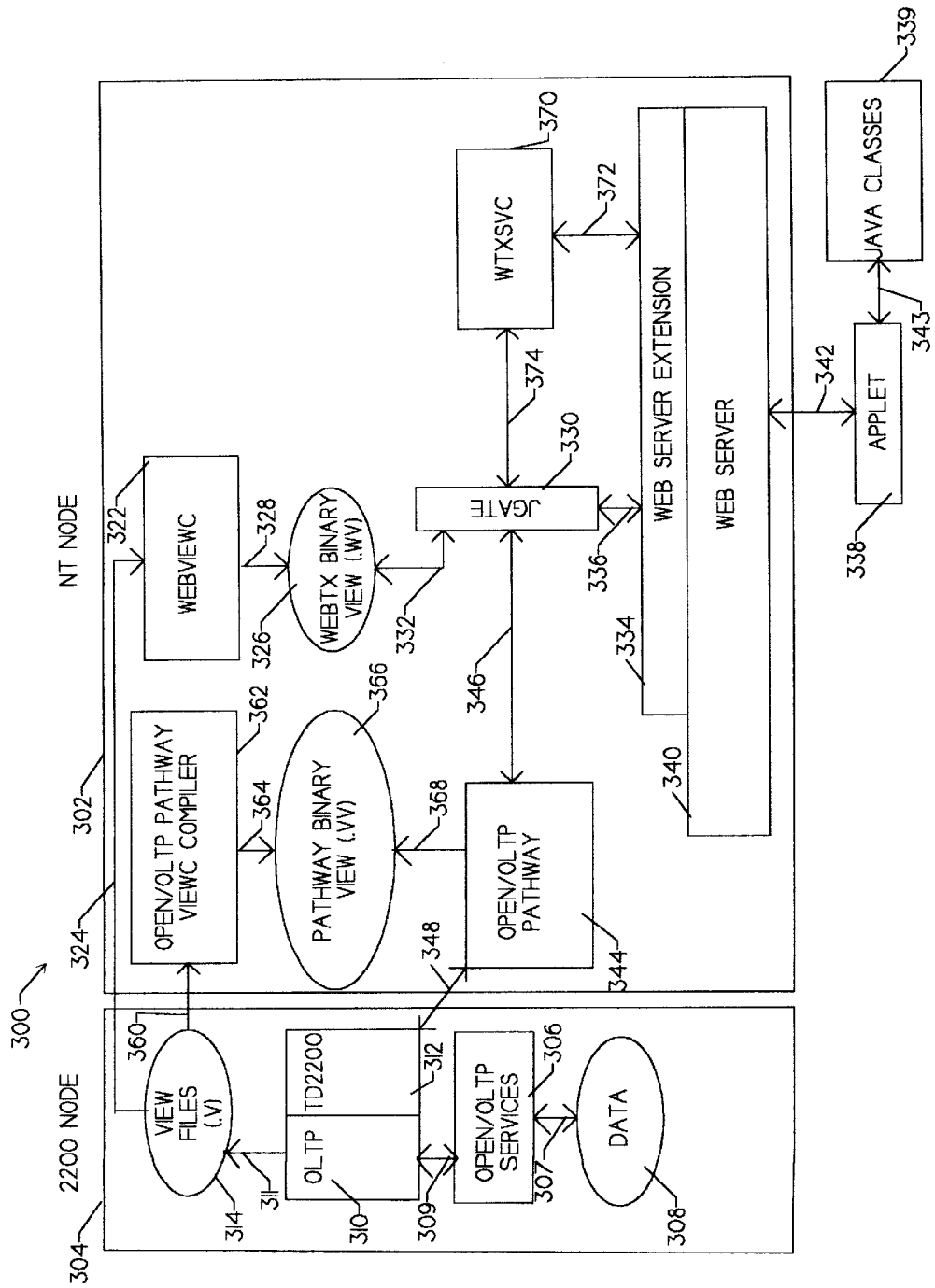
FIG. 4 is a block diagram showing a preferred embodiment of the present invention illustrating a JGate processing environment.

FIG. 4 is a block diagram showing a preferred embodiment of the present invention illustrating the JGate processing environment. The JGate processing environment is shown generally at 300. The environment includes a Windows NT node 302, and a Unisys 2200 node 304 which may be an enterprise server. In this system environment, Open/OLTP services 306 are created by a user on Unisys 2200 node 304, which alternatively may be any other enterprise system. Open/OLTP services 306 may be designed to accomplish a specific task, such as updating a user's bank account balance following a debit or credit.

The database within Unisys 2200 node 304 is shown at 308, and is coupled to Open/OLTP services 306 via interface 307. In the preferred embodiment, database 308 may be one database or may be any number of databases upon which data is stored and wherein one or more operations can be performed on the data. The OLTP transaction processing system upon which Open/OLTP services 306 are capable of operating, are indicated at OLTP 310 and TD 2200 312.

Each service within Open/OLTP services 306 is associated with an input view (.v) file 314 which defines the input view definitions which must be provided to Open/OLTP services 306. View file 314 is coupled to OLTP 310 via interface 311. The input view definitions define the input data format required for the service. The interface to the service is created by use of view files 314 to define the name and the number of parameters necessary to be provided to the service input. View files 314 also define the type of input parameters (for example, integer vs. character string parameters), and also determine the order in which these parameters are provided to the service. Another one of view files 314 is created when the service provides output parameters defining the number and type of the output parameters. View file 314 creates an output data format corresponding to the service which defines the number and type of output parameters. Once the user has developed the service within Open/OLTP services 306, and the associated view file at view files 314, the view files 314 are passed via command-line interface 324 to WebViewC 322 and compiled into WebTx binary view (.wv) files 326 via compilation procedure 328. These view files are then made accessible to any of the gateways running under the WebTx environment. In FIG. 4, only the JGate gateway is indicated at 330, and is shown as being coupled to WebTx binary view 326 via interface 332. The binary view files 326 are passed through the JGate 330 gateway to Web server extension 334 via interface 336. The Web server extension 336 passes the view file definition to applet 338 via Web server 340 through interface 342. JGate 330 is also coupled to WtxSvc 370 via interface 374, and WtxSvc 370 is coupled to Web server extension 334 via interface 372.

Applet 338 may be any one of a number of application programs which are running on a browser. In the preferred embodiment, applet 338 is an application program written in the Java programming language which may be accessed by a Web page within the Web browser. Furthermore, the applet may be copied, via Web server 340, to the Web browser, where applet 338 may then be executed. Java classes 339 are coupled to applet 338 via interface 343. Applet 338 may place all input parameters into a view buffer in the manner of the view file WebTx binary view 326. Applet 338 then passes this view buffer to the Web server 340 through interface 342, which may be a local area network or the Internet. The Web server extension 334 then forwards the request to Jgate 330 via interface 336 through a pipe, which is a standard communication mechanism in the Microsoft operating environment. Jgate 330 then forwards the view buffer to Open/OLTP pathway 344 via interface 346. Open/OLTP pathway 344 establishes a FDDI connection via interface 348 to the OLTP transaction processing system TD 2200 312, and makes a call to the requested service within Open/OLTP services 306. Open/OLTP services 306 performs the request and returns any output data in the output data format provided by view files 314 for that particular service. These output parameters are provided to JGate 330 which in turn forwards a buffer to applet 338 via interface 342. Applet 338 may then extract output data as defined by the view file, and perform additional processing steps or operations on that data. Open/OLTP Pathway 344 is also coupled to Pathway binary view 366 via interface 368. Pathway binary view 366 is compiled by Open/OLTP Pathway viewc compiler 362 via compilation procedure 364. View files 314 are passed to Open/OLTP Pathway viewc compiler 362 via command-line interface 360 for subsequent compilation into Pathway binary view (.vv) files 366.

The steps of processing requests through JGate 330 are now described in more detail. First, it is understood that any program capable of running under a browser could take advantage of the functionality provided by the JGate 330 interface. Initially, the browser user starts an applet herein shown as applet 338. Next applet 338 builds a "get the input view definition" packet and sends it across interface 342 to Web server 340. Web server 340 provides the input view request for the particular requested service to Web server extension 334 to determine whether the request is owned by JGate 330. Web server extension 334 compares the path prefix of the input view request to the list of path prefixes corresponding to currently configured gateways. These gateways have been earlier described in FIG. 2 and FIG. 3 above. If a match is found for JGate 330, the request is sent to that gateway. The input view request includes the type and subtype (i.e., name) of the view for which the information is needed. JGate 330 then opens the .wv file corresponding to the requested view and sends information about the view, its fields and their default values back through Web server extension 334 and Web server 340 to applet 338, via interface 342. The input view definition sent from the JGate 330 interface allows the browser upon which applet 338 resides to build an input screen using the input view definition. The input view definition defines the input data format by defining a number of input fields which accept input data entries from the user to be provided by applet 338 to Open/OLTP services 306. Web server extension 334 decides who owns the input view request by comparing a portion of the input view request (e.g., the "get the input view definition") to a number of known portions corresponding to the predetermined type. In the preferred embodiment, the predetermined type is the JGate 330 interface. The portion of the input view request is a path prefix which is compared to a list of path prefixes corresponding to the currently configured WebTx gateways (see also, FIG. 2 and FIG. 3). Web server extension 334 then sends the input view request to the JGate 330 interface if the path prefix is equal to the path prefix within the list of path prefixes corresponding to the JGate 338 interface. The path prefix may also be a portion of an address path which is a portion of the input view request. The predetermined type is a JGate view type corresponding to JGate 330.

Next, the user takes an action which invokes a service call to 2200 node 304. Applet 338 may execute the service routine at Open/OLTP services 306 through the JGate 330 interface by sending a service request to Web server 340. The service request contains one or more data entries in the input data format corresponding to the requested service. Web server 340 again lets Web server extension 334 decide whether it owns the request. Web server extension 334 again compares the path prefix to the list of path prefixes corresponding to the currently configured WebTx gateways. When a match is found for the JGate 330 gateway, the request is sent to that gateway. Included in the request is the service name, the input view type (e.g., X_C_TYPE) and subtype (i.e., the view name), and name=value pairs providing values for data fields within the input view. JGate 330 then opens the .wv file corresponding to the requested input view and builds the view field data into the template provided by the .wv file or input view definition. JGate 330 also calls Open/OLTP services 306 on 2200 node 304 (via tpcall( )). Open/OLTP services 306 eventually sends a response back to JGate 330 (via tpreturn( )). Included in the information sent back is the output view type and subtype and data for fields within the output view.

The output definition defines the output data format required for applet 338 to receive the result. Applet 338 can then build an output screen on the browser using the output view definition, wherein the output view definition defines the output data format by defining the output fields. Each one of the output fields can accept one or more data items and display the one or more items on the output screen. If the input data format is equal to the output data format, only the field values need be sent to applet 338 from JGate 330. Furthermore, the input and output formats received by applet 338 allow applet 338 to perform one or more operations on the output result and submit additional service requests. These additional service requests have one or more input data entries which may be based on applet 338 completing operations on the previous output result. Once Open/OLTP services 306 sends a response back to JGate 330, JGate 330 sends the information about the output view, fields and default values via Web server extension 334 and Web server 340 to applet 338. JGate 330 uses the binary view template (.wv) for the output view. However, if the output view and input view are the same, then JGate 330 only sends field values. Once applet 338 receives the output view, it may present the information on the browser in a relevant fashion.

Figure 5:
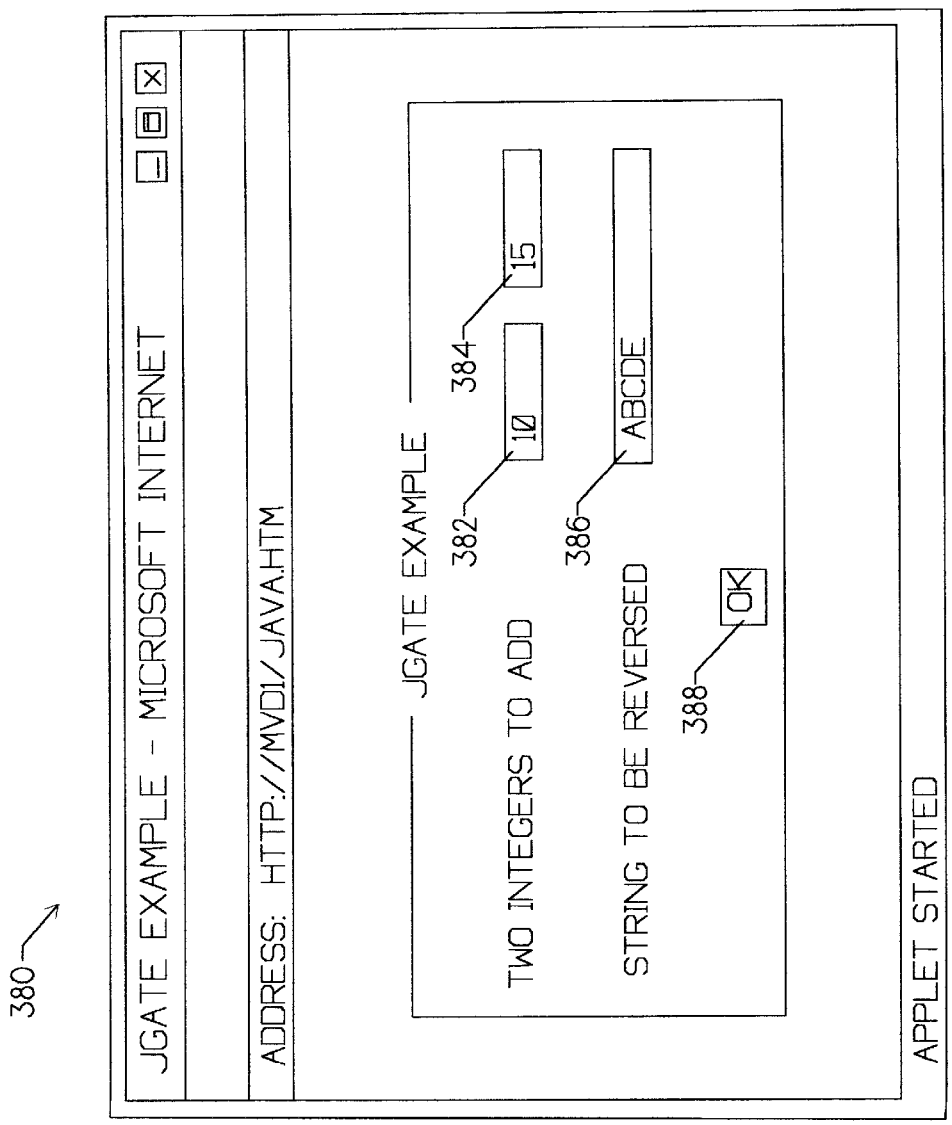
FIG. 5 is a diagram showing an exemplary input view on a browser using an input view definition within the JGate processing environment.

FIG. 5 is a diagram showing an exemplary input view on a browser using an input view definition within the JGate processing environment. The input view shown at 380 is exemplary of a view seen from the browser as a result of applet 338 building the input screen using the input view definition passed from JGate 330. In this example, the input screen shows the input view definition defining the input data format through a number of input fields. Input field 382 accepts a first of two integers to add. Input field 384 accepts a second of two integers to add. Input field 386 accepts a 5 character string to be reversed. Once the input data entries have been entered, a user may click on the OK button at 388 to pass the service request to Open/OLTP services 306, where the requested service routine may be executed.

Figure 6:
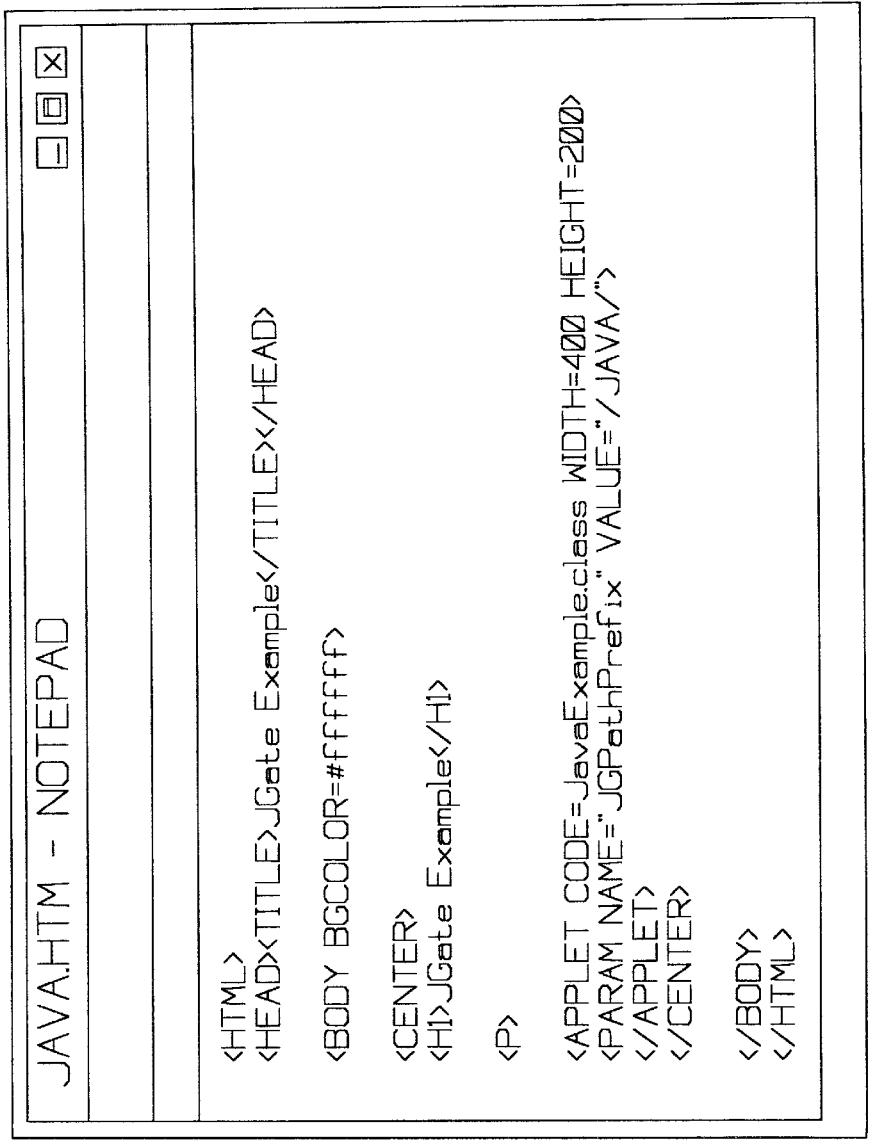
FIG. 6 is a diagram showing the HTML code created by the user to include the Java applet on the screen of a browser as shown in FIG. 5, which accepts input data for the input view definition within the JGate processing environment.

FIG. 6 is a diagram showing the HTML code created by the user to include the Java applet on the screen of a browser as shown in FIG. 5, which accepts input data for the input view definition. The HTML code is shown generally at 400.

Figure 7:
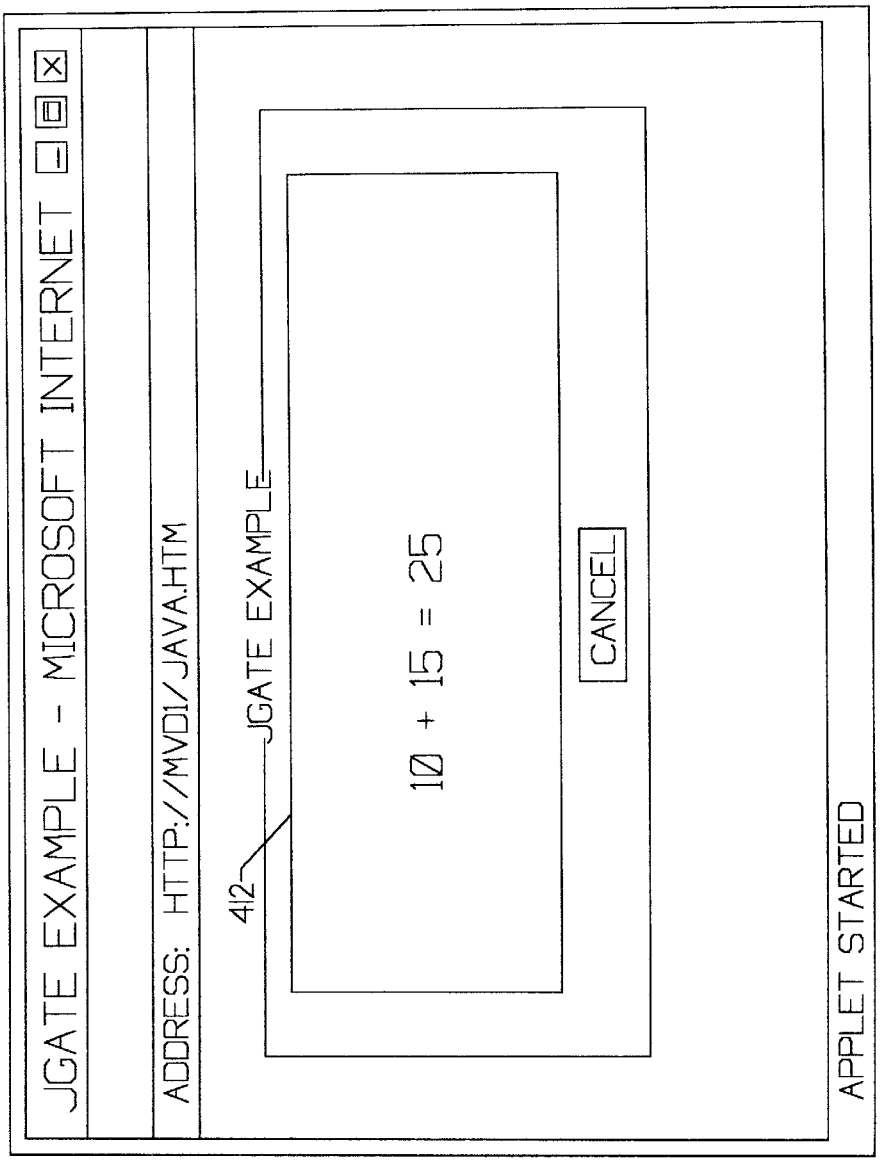
FIG. 7 is a diagram showing an exemplary output view on a browser corresponding to the input screen of FIG. 5 using an output view definition within the JGate processing environment.

FIG. 7 is a diagram showing an exemplary output view on the browser corresponding to the input screen of FIG. 5 using an output view definition within the JGate processing environment. The exemplary output view is shown generally at 410 and indicates the result of applet 338 building an output screen on the browser using the output view definition returned from Open/OLTP services 306. The output view definition defines the output data format by defining the output fields displaying the output data items. Output field 412 indicates the result of adding the integers at input fields 382 and 384 of FIG. 5.

FIG. 8 shows exemplary input and output views for an exemplary embodiment of the present invention. In this example, a retail outlet marks down a list of products that have not sold well in a certain region. The regional manager uses an administrative applet over the corporate intranet which contains the method MarkDown (see FIG. 9). The MarkDown method takes as input an array of integers representing store ID numbers, and steps through each of these IDs calling the service GetWorstTwo. The service GetWorstTwo takes the input view shown at 420 as input. The service GetWorstTwo then queries the database for the two products at the particular store which have had the lowest sales.

The service GetWorstTwo returns the product ID output view as shown at 430. The output view at 430 indicates two products, with "num" set to two, and "prodids" containing the ID numbers of the two products. The method repeats the service GetWorstTwo for all of the store IDs in the array. The view at 430 assumes that no more than 10 store IDs are passed to the method, since this view can hold no more than 20 product IDs at a time.

Once all the product IDs have been gathered, the resulting view at 430 is passed to the CutRedTape service, which performs additional processing, before approving the particular products for markdown. The output view returned by the CutRedTape service is shown at 440. If, for example, the approval was for a percentage markdown allowed for the requested products, the percentage could have been returned by the method as a double-precision value in "approved."

FIG. 9 shows the Java applet's MarkDown method for the exemplary embodiment of FIG. 8. The MarkDown method is shown generally at 450.

First, a store ID input view must be constructed and the field number for the id field must be retrieved. The line at 452 retrieves the input view shown at 420 in FIG. 8. The line at 454 retrieves the number of the field "id" and stores the number in the local variable "idField."

Next, the product ID view shown at 430 must be prepared. The line at 456 retrieves the view called PRODUCT_IDS, where PRODUCT_IDS is the view name and "gatewayURL" indicates the URL for JGate. The line at 458 retrieves the number of the field "prodids" and stores the number in the local variable "prodidsField."

Next, the view for the store ID is set up, wherein a loop is initiated for all the store IDs. The line at 460 indicates setting up the view for the store ID using the field number for the field "id", retrieved from the local variable "idField."

Next, the service GetWorstTwo is called. The Unisys 2200 service is called at line 462. This service call gets the first two product IDs returned by the service.

Next, data is extracted from the output view buffer as indicated at line 464. This is possible because the location of the field "prodids" was obtained at line 458 above into the local variable "prodidsField."

Once the products to mark down have been placed in the PRODUCT_IDS view, the "num" field of the view must be set to indicate to the service how many products to operate on before the service is called. This is indicated at line 466.

A second service, CutRedTape, is called at line 468. Once the RED_TAPE view has been placed in "returnView", the approval percentage can be retrieved.

Figure 10A:
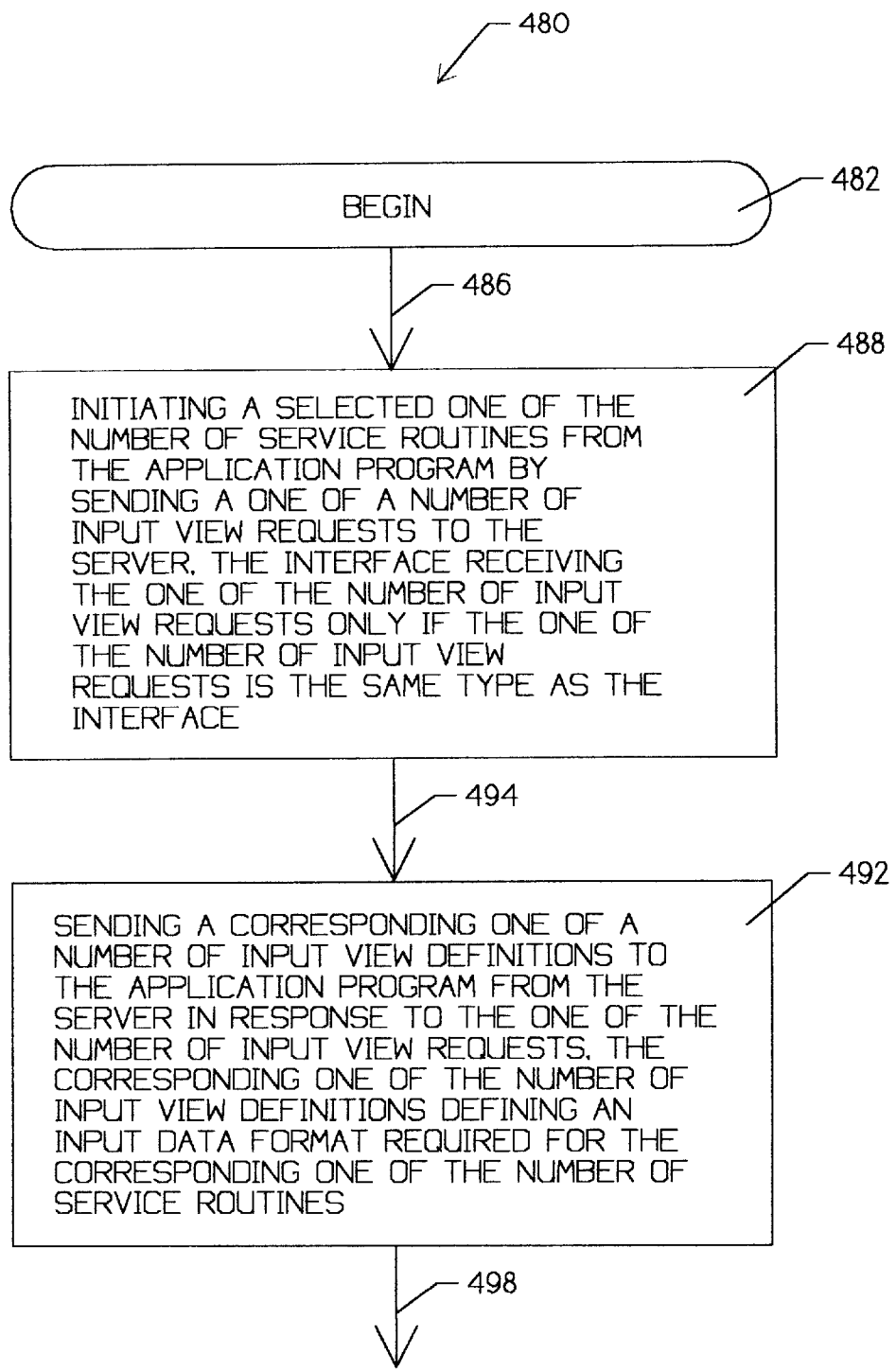
FIGS. 10A and 10B are a flow diagram showing an exemplary method of the present invention.
Figure 10B:
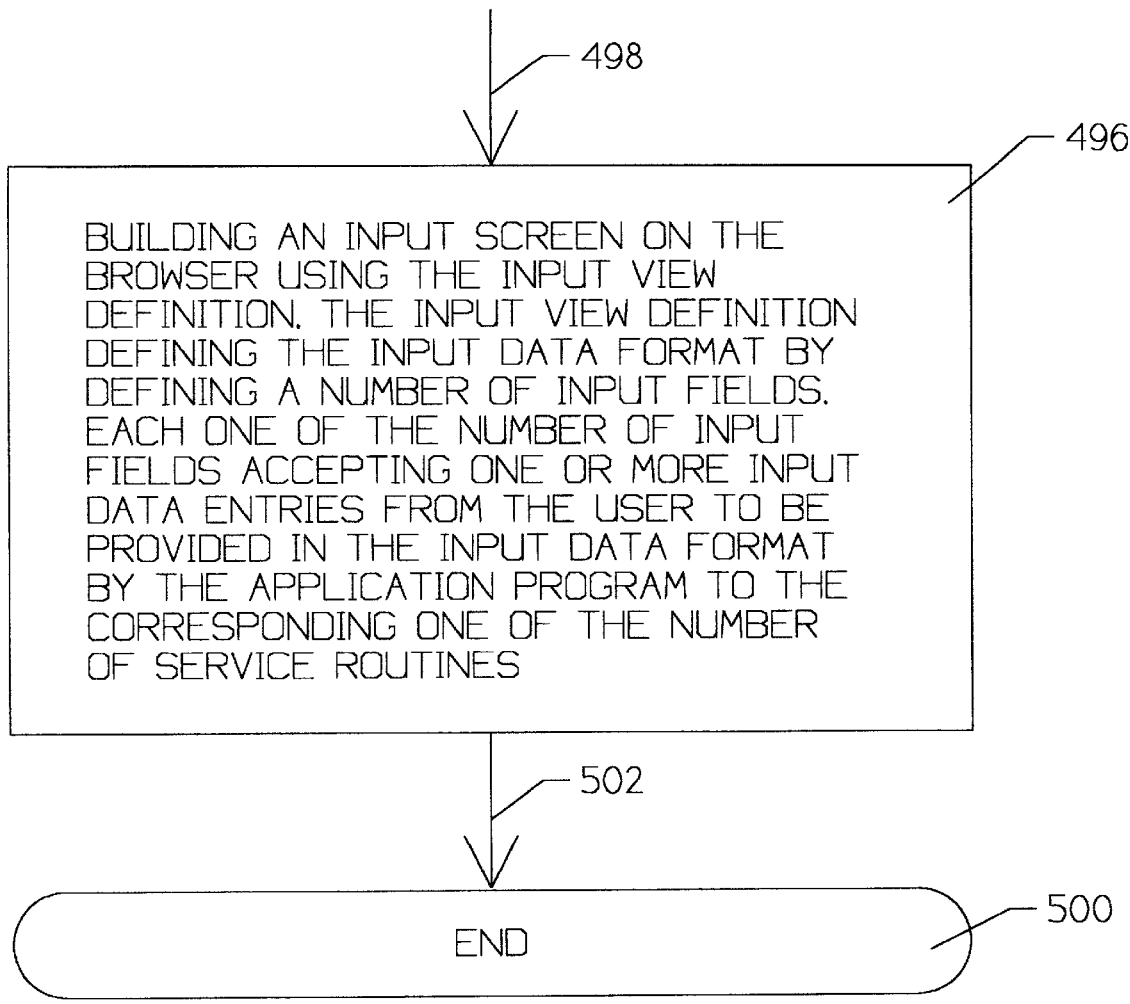

FIGS. 10A and 10B are a flow diagram showing an exemplary method of the present invention. The flow diagram initiates one or more operations on data stored in a transaction processing system wherein a user interfaces with a browser which is coupled to a server, and wherein an interface is coupled to the server and the server is coupled to the transaction processing system. An application program is executable on the browser. The transaction processing system includes one or more databases wherein each one of a number of service routines resident on the transaction processing system performs one or more operations on data stored in the one or more databases. The flow diagram is shown generally at 480. The flow diagram is entered at element 482, wherein control is passed to element 488 via interface 486. Element 488 initiates a selected one of the number of service routines from the application program by sending a one of a number of input view requests to the server, where the interface receives the one of the number of input view requests only if the one of the number of input view requests is the same type as the interface. Element 488 may further comprise determining if the one of the number of input view requests is the same type as the interface by comparing a portion of the one of the number of input view requests to each one of a number of known portions, where the one of the number of input view requests is the same type as the interface if the portion of the one of the number of input view requests is equal to the one of the number of known portions corresponding to the interface. Element 488 may further comprise downloading the application program from the browser to the server. Control is then passed to element 492 via interface 494. Element 492 sends a corresponding one of a number of input view definitions to the application program from the server in response to the one of the number of input view requests, where the corresponding one of the number of input view definitions defines an input data format required for the corresponding one of the number of service routines. Control is then passed to element 496 via interface 498. Element 496 builds an input screen on the browser using the input view definition, where the input view definition defines the input data format by defining a number of input fields, where each one of the number of input fields accepts one or more input data entries from the user and are provided in the input data format by the application program to the corresponding one of the number of service routines. Control is then passed to element 500 via interface 502, where the algorithm is exited.

Figure 11A:
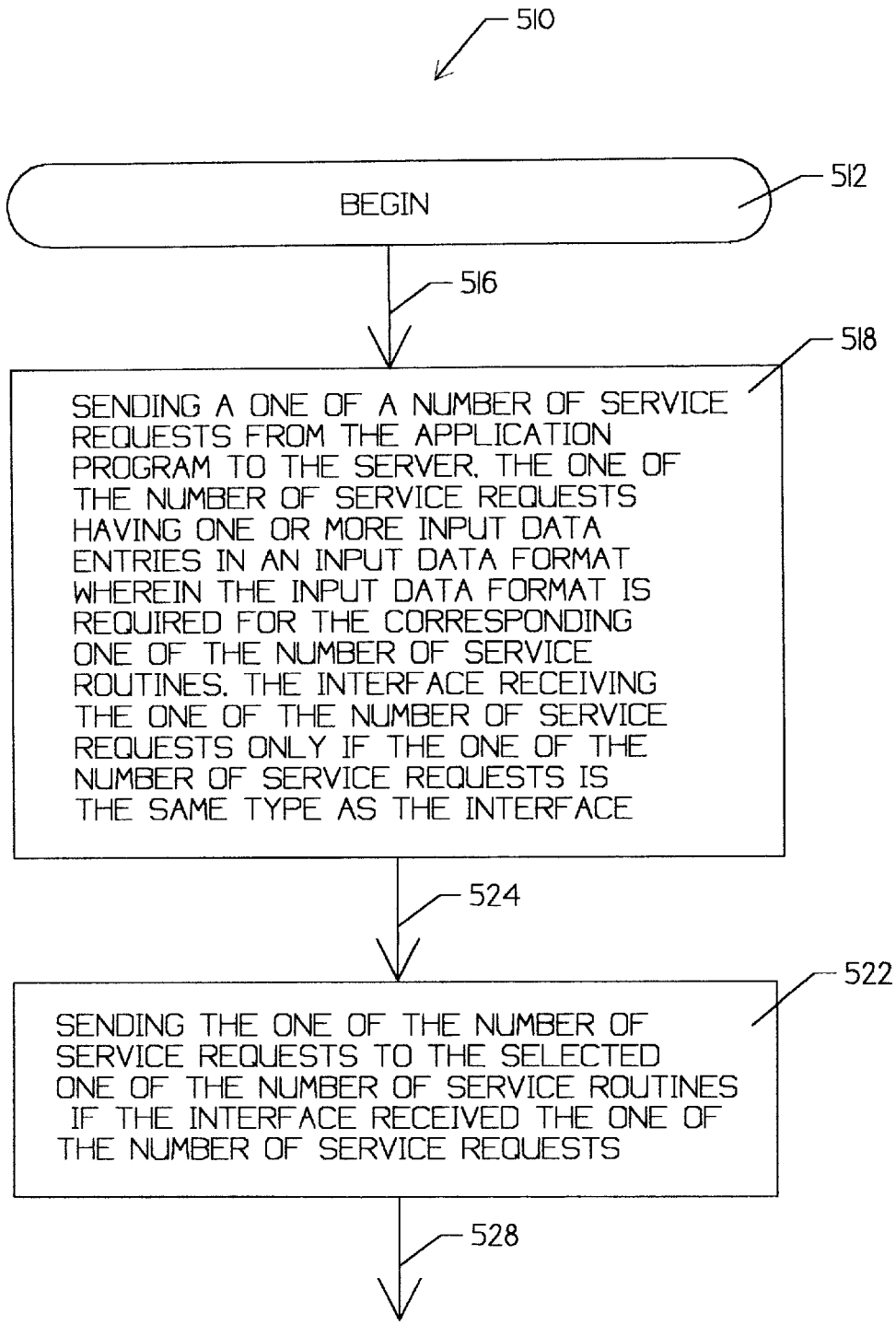
FIGS. 11A and 11B are a flow diagram showing a second exemplary method of the present invention.
Figure 11B:
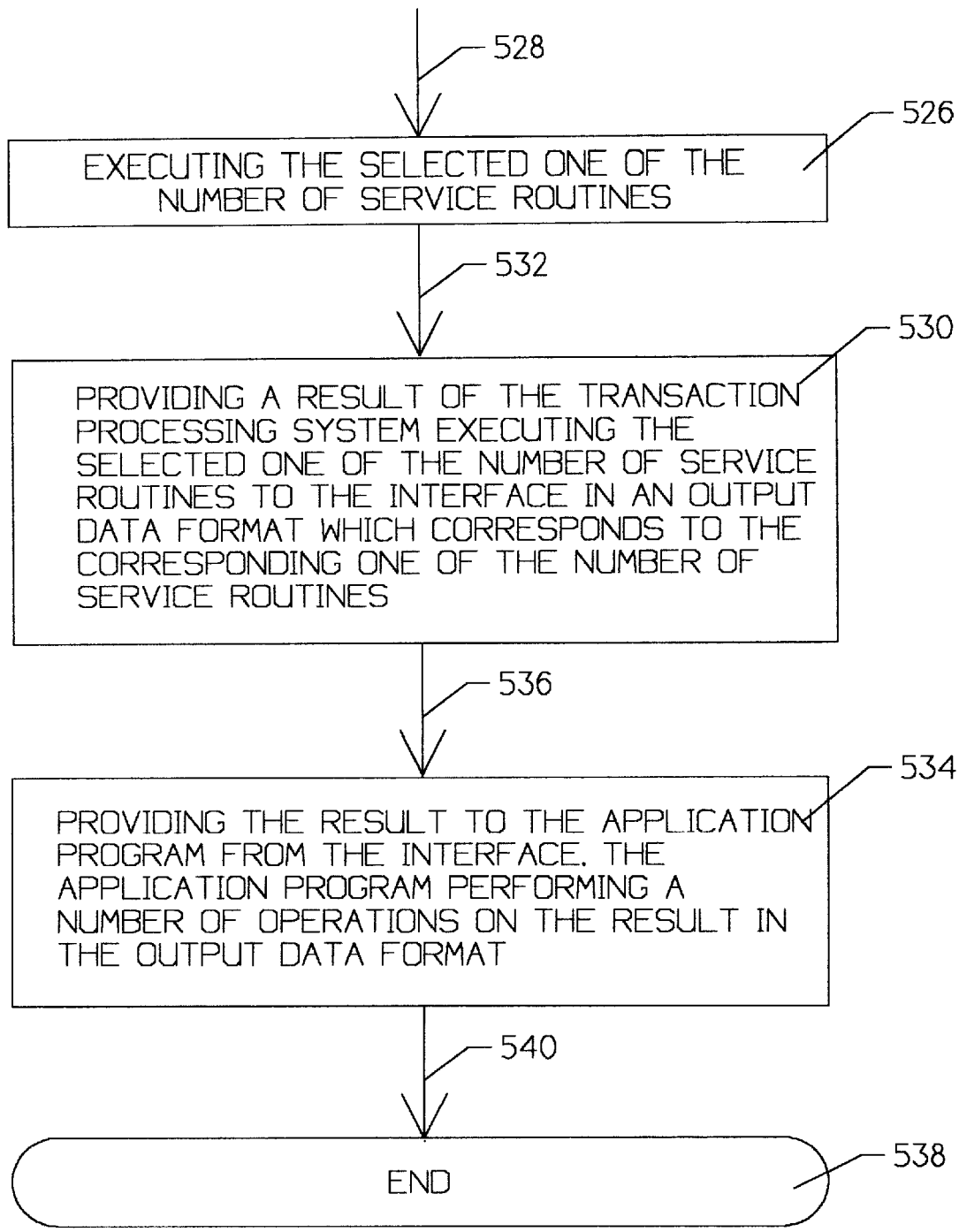

FIGS. 11A and 11B are a flow diagram showing a second exemplary method of the present invention. The flow diagram initiates one or more operations on data stored in a transaction processing system wherein a user interfaces with a browser which is coupled to a server, and wherein an interface is coupled to the server and the server is coupled to the transaction processing system. An application program is executable on the browser. The transaction processing system includes one or more databases wherein each one of a number of service routines resident on the transaction processing system performs one or more operations on data stored in the one or more databases. The flow diagram is shown generally at 510. The flow diagram is entered at element 512, wherein control is passed to element 518 via interface 516. Element 518 sends a one of a number of service requests from the application program to the server, where the one of the number of service requests have one or more input data entries in an input data format, wherein the input data format is required for the corresponding one of the number of service routines, and where the interface receives the one of the number of service requests only if the one of the number of service requests is the same type as the interface. Element 518 may further comprise determining if the one of the number of service requests is the same type as the interface by comparing a portion of the one of the number of service requests to each one of a number of known portions, where the one of the number of service requests is the same type as the interface if the portion of the one of the number of service requests is equal to the one of the number of known portions corresponding to the interface. Element 518 may further comprise downloading the application program from the browser to the server. Control is then passed to element 522 via interface 524. Element 522 sends the one of the number of service requests to the selected one of the number of service routines if the interface received the one of the number of service requests. Control is then passed to element 526 via interface 528. Element 526 executes the selected one of the number of service routines. Control is then passed to element 530 via interface 532. Element 530 provides a result of the transaction processing system executing the selected one of the number of service routines to the interface in an output data format which corresponds to the corresponding one of the number of service routines. Element 530 may further send a corresponding one of a number of output view definitions to the application program from the corresponding one of the number of service routines, where the corresponding one of the number of output view definitions defines an output data format required for the application program to receive the result, and may build an output screen on the browser using the output view definition, where the output view definition defines the output data format by defining a number of output fields, each one of the number of output fields accepting one or more data items and displaying the one or more data items in the output screen, where the result is comprised of the one or more data items. Element 530 may further comprise sending a corresponding one of a number of input view definitions to the application program from the server, where the corresponding one of the number of input view definitions defines the input data format required for the corresponding one of the number of service routines, and may build an input screen on the browser using the input view definition, where the input view definition defines the input data format by defining a number of input fields, each one of the number of input fields accepting one or more input data entries from the user to be provided in the input data format to the application program, where the application program uses the one or more input data entries to perform the number of operations on the result. Control is then passed to element 534 via interface 536. Element 534 provides the result to the application program from the interface, where the application program performs a number of operations on the result in the output data format. Element 534 may further include the user providing one or more input data entries in the input data format to the application program, where the application program uses the one or more input data entries to perform the number of operations on the result. Element 534 may further include the application program sending another one of the number of service requests to the server, where the another one of the number of service requests has one or more input data entries in the input data format, where the input data format corresponds to the corresponding one of the number of service routines, where the interface receives the one of the number of service requests only if the one of the number of service requests is the same type as the interface. Control is then passed to element 538 via interface 540, where the algorithm is exited.

Having thus described the preferred embodiments of the present invention, those of skill in the art will readily appreciate that the teachings found herein may be applied to yet other embodiments within the scope of the claims hereto attached.

What is claimed is:

1. In a data processing system wherein a browser is coupled to a server and the server is coupled to a transaction processing system, the transaction processing system including one or more databases wherein each one of a number of service routines resident on the transaction processing system performs one or more operations on data stored in the one or more databases, the improvement comprising:

a. an interface coupled to the server wherein the browser initiates a selected one of the number of service routines through said interface, said interface providing a result of the transaction processing system executing said selected one of the number of service routines to the browser in a format which allows the browser to perform a number of operations on said result.

2. A data processing system wherein a user interfaces with a browser which is coupled to a server, the server being coupled to a transaction processing system, the transaction processing system including one or more databases wherein each one of a number of service routines resident on the transaction processing system performs one or more operations on data stored in the one or more databases, comprising:

a. an application program executable on the browser; and
   b. an interface coupled to the server wherein said application program initiates a selected one of the number of service routines through said interface, said interface providing a result of the transaction processing system executing said selected one of the number of service routines to said application program in a format which allows said application program to perform a number of operations on said result.

3. A data processing system according to claim 2 wherein said application program initiates a selected one of the number of service routines through said interface by sending a one of a number of input view requests to the server, said interface receiving said one of said number of input view requests only if said one of said number of input view requests is a predetermined type, said interface sending a corresponding one of a number of input view definitions to said application program in response to said one of said number of input view requests, said corresponding one of said number of input view definitions defining an input data format required for said corresponding one of said number of service routines.

4. A data processing system according to claim 3 wherein said application program builds an input screen on the browser using said input view definition, said input view definition defining said input data format by defining a number of input fields, each one of said number of input fields accepting one or more input data entries from the user to be provided in said input data format by said application program to said corresponding one of said number of service routines.

5. A data processing system according to claim 3 further comprising a server extension coupled to said interface, said server extension determining if said one of said number of input view requests is said predetermined type by comparing a portion of said one of said number of input view requests to a known portion, said known portion corresponding to said predetermined type, said server extension sending said one of said number of input view requests to said interface if said portion of said one of said number of input view requests is equal to said known portion.

6. A data processing system according to claim 5 wherein said one of the number of input view requests comprises an address path, a portion of said address path being said portion of said one of said number of input view requests.

7. A data processing system according to claim 6 wherein said portion of said address path is a path prefix.

8. A data processing system according to claim 6 wherein the server extension is a WebTx server extension.

9. A data processing system according to claim 5 wherein said interface is a JGate interface, said server extension sending said one of said number of input view requests to said JGate interface when said predetermined type is a JGate view type.

10. A data processing system according to claim 5 wherein the data processing system wherein said application program is written in the Java programming language.

11. A data processing system according to claim 10 wherein said application program written in said Java programming language is a Java applet.

12. A data processing system according to claim 3 wherein the application program is downloaded from the browser to the server.

13. A data processing system according to claim 2 wherein said application program executes a selected one of the number of service routines resident on the transaction processing system through said interface by sending a one of a number of service requests to the server, said one of said number of service requests having one or more input data entries in an input data format wherein said input data format is required for said selected one of said number of service routines, said interface sending said one of said number of service requests having said input format to said selected one of said number of service routines only if said one of said number of service requests is a predetermined type so that said selected one of said number of service routines can perform the one or more operations using the input data on the data stored in the one or more databases.

14. A data processing system according to claim 13 wherein the server further comprises a server extension coupled to said interface, said server extension determining if said one of said number of service requests is said predetermined type by comparing a portion of said one of said number of service requests to a known portion, said server extension sending said one of said number of service requests to said interface if said portion of said one of said number of service requests is equal to said known portion.

15. A data processing system according to claim 13 wherein said interface receives a result of the transaction processing system executing said selected one of the number of service routines in an output data format which corresponds to said corresponding one of said number of service routines, said interface providing said result to said application program so that said application program can perform a number of operations on said result.

16. A data processing system according to claim 15 wherein the user provides one or more input data entries in said input data format to said application program, said application program using said one or more input data entries to perform said number of operations on said result.

17. A data processing system according to claim 16 wherein said application program sends another one of said number of service requests to the server, said another one of said number of service requests having said one or more input data entries in said input data format, said input data format corresponding to said corresponding one of said number of service routines, said interface receiving said one of said number of service requests only if said one of said number of service requests is the same type as said interface.

18. A data processing system according to claim 17 wherein said application program receives a corresponding one of a number of output view definitions from said selected one of said number of service routines, said corresponding one of said number of output view definitions defining an output data format required for said application program to receive said result.

19. A data processing system according to claim 18 wherein said application program builds an output screen on the browser using said output view definition, said output view definition defining said output data format by defining a number of output fields, each one of said number of output fields accepting one or more data items and displaying said one or more output items in said output screen, said result being comprised of said one or more data items.

20. A data processing system according to claim 18 wherein said application program sends another one of said number of service requests to the server, said another one of said number of service requests having said one or more input data entries in said input data format, said input data format corresponding to said selected one of said number of service routines, said interface receiving said one of said number of service requests only if said one of said number of service requests is said predetermined type.

21. A data processing system according to claim 20 wherein each one of said number of service requests comprises an address path, a portion of said address path being said portion of said one of said number of service requests.

22. A data processing system according to claim 21 wherein said portion of said address path is a path prefix.

23. A data processing system according to claim 22 wherein the server extension is a WebTx server extension.

24. A data processing system according to claim 20 wherein said interface is a JGate interface, said server extension sending said one of said number of input view requests to said JGate interface when said predetermined type is a JGate view type.

25. A data processing system according to claim 20 wherein the data processing system wherein said application program is written in the Java programming language.

26. A data processing system according to claim 25 wherein said one of said number of application programs written in said Java programming language is a Java applet.

27. A data processing system according to claim 12 wherein the application program is downloaded from the browser to the server.

28. A data processing system wherein a browser is coupled to a server and the server is coupled to a transaction processing system, a number of application programs which are executable on the browser, the transaction processing system including one or more databases wherein each one of a number of service routines resident on the transaction processing system performs one or more operations on data stored in the one or more databases, comprising:
   a. a number of interfaces coupled to the server wherein a one of the number of application programs initiates a selected one of the number of service routines through a one of said number of interfaces, said one of said number of interfaces providing a result of the transaction processing system executing said selected one of the number of service routines to said one of the number of application programs in a format which allows said one of the number of application programs to perform a number of operations on said result.

29. A data processing system according to claim 28 wherein said one of the number of application programs initiates a selected one of the number of service routines through said one of said number of interfaces by sending a one of a number of input view requests to the server, said one of said number of interfaces receiving said one of said number of input view requests only if said one of said number of input view requests is the same type as said one of said number of interfaces, said one of said number of interfaces sending a corresponding one of a number of input view definitions to said one of the number of application programs in response to said one of said number of input view requests, said corresponding one of said number of input view definitions defining an input data format required for said corresponding one of said number of service routines.

30. A data processing system according to claim 29 wherein the server further comprises a server extension coupled to said number of interfaces, said server extension determining if said one of said number of input view requests is the same type as said one of said number of interfaces by comparing a portion of said one of said number of input view requests to each one of a number of known portions, each said one of said number of known portions corresponding to a unique one of said number of interfaces, said one of said number of input view requests being the same type as said one of said number of interfaces if said portion of said one of said number of input view requests is equal to said one of said number of known portions corresponding to said one of said number of interfaces.

31. A data processing system according to claim 28 wherein said one of the number of application programs executes a selected one of the number of service routines through said one of said number of interfaces by sending a one of a number of service requests to the server, said one of said number of interfaces receiving said one of said number of service requests only if said one of said number of service requests is the same type as said one of said number of interfaces.

32. A data processing system according to claim 31 wherein the server further comprises a server extension coupled to said number of interfaces, said server extension determining if said one of said number of service requests is the same type as said one of said number of interfaces by comparing a portion of said one of said number of service requests to each one of a number of known portions, each said one of said number of known portions corresponding to a unique one of said number of interfaces, said one of said number of service requests being the same type as said one of said number of interfaces if said portion of said one of said number of service requests is equal to said one of said number of known portions corresponding to said one of said number of interfaces.

33. A data processing system wherein a browser is coupled to a server and the server is coupled to a transaction processing system, a number of application programs which are executable on the browser, the transaction processing system including one or more databases wherein each one of a number of service routines resident on the transaction processing system performs one or more operations on data stored in the one or more databases, comprising:
   a. initiation means coupled to the server, a one of the number of application programs initiating a selected one of the number of service routines by sending a one of a number of input view requests to the server, said initiation means receiving said one of said number of input view requests only if said one of said number of input view requests is the same type as said initiation means, said initiation means sending a corresponding one of a number of input view definitions to said one of the number of application programs in response to said one of said number of input view requests, said corresponding one of said number of input view definitions defining an input data format required for said corresponding one of said number of service routines;
   b. execution means coupled to the server, said one of the number of application programs executing a selected one of the number of service routines through said execution means by sending a one of a number of service requests to the server, said one of said number of service requests having said input data format for said corresponding one of said number of service routines, said execution means receiving said one of said number of service requests only if said one of said number of service requests is the same type as said execution means, said execution means providing a result of the transaction processing system executing said selected one of the number of service routines to said one of the number of application programs in an output data format which allows said one of the number of application programs to perform a number of operations on said result; and c. selection means coupled to the server, said selection means determining if said one of said number of input view requests is the same type as said initiation means by comparing a portion of said one of said number of input view requests to each one of a number of known portions, said one of said number of input view requests being the same type as said initiation means if said portion of said one of said number of input view requests is equal to said one of said number of known portions corresponding to said initiation means, said selection means determining if said one of said number of service requests is the same type as said execution means by comparing a portion of said one of said number of service requests to each one of a number of known portions, said one of said number of service requests being the same type as said execution means if said portion of said one of said number of service requests is equal to said one of said number of known portions corresponding to said execution means.

34. A method for completing one or more transactions on a transaction processing system from an application program resident on a browser wherein the browser and an interface are coupled to a server and the server is coupled to the transaction processing system, each one of a number of service routines resident on the transaction processing system performing the one or more transactions, the method comprising the steps of:

a. initiating a selected one of the number of service routines through the interface from the application program; and b. providing a result of the transaction processing system executing the selected one of the number of service routines from the transaction processing system through the interface to the application program in a format which allows the application program to perform a number of operations on said result.

35. A method for initiating one or more operations on data stored in a transaction processing system wherein a user interfaces with a browser which is coupled to a server, an interface being coupled to the server and the server being coupled to the transaction processing system, an application program which is executable on the browser, the transaction processing system including one or more databases wherein each one of a number of service routines resident on the transaction processing system performs one or more operations on data stored in the one or more databases, the method comprising the steps of:

a. initiating a selected one of the number of service routines from the application program by sending a one of a number of input view requests to the server, the interface receiving said one of said number of input view requests only if said one of said number of input view requests is the same type as the interface;

b. sending a corresponding one of a number of input view definitions to the application program from said server in response to said one of said number of input view requests, said corresponding one of said number of input view definitions defining an input data format required for said corresponding one of said number of service routines; and c. building an input screen on the browser using said input view definition, said input view definition defining said input data format by defining a number of input fields, each one of said number of input fields accepting one or more input data entries from the user to be provided in said input data format by the application program to said corresponding one of said number of service routines.

36. A method according to claim 35 wherein step (b) further comprises the step of determining if said one of said number of input view requests is the same type as the interface by comparing a portion of said one of said number of input view requests to each one of a number of known portions, said one of said number of input view requests being the same type as the interface if said portion of said one of said number of input view requests is equal to said one of said number of known portions corresponding to the interface.

37. A method according to claim 36 wherein the interface is a JGate interface.

38. A method according to claim 35 wherein step (b) further comprises the step of downloading the application program from the browser to the server.

39. A method for initiating one or more operations on data stored in a transaction processing system wherein a user interfaces with a browser which is coupled to a server, an interface being coupled to the server and the server being coupled to the transaction processing system, an application program which is executable on the browser, the transaction processing system including one or more databases wherein each one of a number of service routines resident on the transaction processing system performs one or more operations on data stored in the one or more databases, the method comprising the steps of:

a. sending a one of a number of service requests from the application program to the server, said one of said number of service requests having one or more input data entries in an input data format wherein said input data format is required for said corresponding one of said number of service routines, the interface receiving said one of said number of service requests only if said one of said number of service requests is the same type as the interface;

b. sending said one of said number of service requests to said selected one of the number of service routines if the interface received said one of said number of service requests;

c. executing said selected one of the number of service routines;

d. providing a result of the transaction processing system executing said selected one of the number of service routines to the interface in an output data format which corresponds to said corresponding one of said number of service routines; and e. providing said result to the application program from the interface, the application program performing a number of operations on said result in said output data format.

40. A method according to claim 39 wherein step (e) further includes the user providing one or more input data entries in said input data format to the application program, the application program using said one or more input data entries to perform said number of operations on said result.

41. A method according to claim 39 wherein step (e) further includes the application program sending another one of said number of service requests to the server, said another one of said number of service requests having said one or more input data entries in said input data format, said input data format corresponding to said corresponding one of said number of service routines, the interface receiving said one of said number of service requests only if said one of said number of service requests is the same type as the interface.

42. A method according to claim 39 wherein step (e) further comprises the steps of:
   a. sending a corresponding one of a number of output view definitions to the application program from said corresponding one of said number of service routines, said corresponding one of said number of output view definitions defining an output data format required for the application program to receive said result; and
   b. building an output screen on the browser using said output view definition, said output view definition defining said output data format by defining a number of output fields, each one of said number of output fields accepting one or more data items and displaying said one or more data items in said output screen, said result being comprised of said one or more data items.

43. A method according to claim 39 wherein step (e) further comprises the steps of:
   a. sending a corresponding one of a number of input view definitions to the application program from said server, said corresponding one of said number of input view definitions defining said input data format required for said corresponding one of said number of service routines; and
   b. building an input screen on the browser using said input view definition, said input view definition defining said input data format by defining a number of input fields, each one of said number of input fields accepting one or more input data entries from the user to be provided in said input data format to the application program, the application program using said one or more input data entries to perform said number of operations on said result.

44. A method according to claim 39 wherein step (b) further comprises the step of determining if said one of said number of service requests is the same type as the interface by comparing a portion of said one of said number of service requests to each one of a number of known portions, said one of said number of service requests being the same type as the interface if said portion of said one of said number of service requests is equal to said one of said number of known portions corresponding to the interface.

45. A method according to claim 39 wherein step (b) further comprises the step of downloading the application program from the server to the browser.

46. A method according to claim 44 wherein the interface is a JGate interface.

\* \* \* \* \*